United States Patent [19]

Kuwahara

[11] Patent Number: 5,599,416
[45] Date of Patent: Feb. 4, 1997

[54] THERMALLY TRANSFERABLE TYPE EMBLEM MADE OF THERMOPLASTIC SYNTHETIC RESIN AND METHOD OF MANUFACTURING THE SAME

[76] Inventor: Eiji Kuwahara, Omiya Mansion, No. 25-18, Nakamiya 2-Chome, Asahi-Ku, Osaka-Shi, Osaka-Fu, Japan

[21] Appl. No.: 439,885

[22] Filed: May 12, 1995

Related U.S. Application Data

[62] Division of Ser. No. 151,110, Nov. 12, 1993, Pat. No. 5,520,988.

[51] Int. Cl.$^6$ ..................................... B41M 3/12
[52] U.S. Cl. .................. 156/219; 156/220; 156/232; 156/234; 156/235; 156/240; 156/272.2; 156/274.4; 156/277; 156/553; 156/581; 264/32; 264/132; 264/134; 264/293; 264/322; 427/146; 427/147; 427/152; 428/161; 428/195; 428/913; 428/914
[58] Field of Search ..................... 156/209, 219, 156/220, 232, 234, 235, 239, 240, 272.2, 274.4, 277, 553, 581; 264/32, 132, 134, 293, 322; 427/146, 147, 152; 428/161, 187, 195, 913, 914

[56] References Cited

U.S. PATENT DOCUMENTS

| | | | |
|---|---|---|---|
| 3,629,034 | 12/1971 | Nishisawa | 156/219 |
| 3,916,046 | 10/1975 | Youngberg | 428/31 |
| 4,130,623 | 12/1978 | Walter | 264/293 |
| 4,278,483 | 7/1981 | Mansolillo | 156/79 |
| 4,555,423 | 11/1985 | Sands | 428/79 |
| 5,120,589 | 6/1992 | Morikawa et al. | 428/76 |
| 5,143,672 | 9/1992 | Kuwahara | 264/132 |

FOREIGN PATENT DOCUMENTS

| | | | |
|---|---|---|---|
| 43-15353 | 6/1968 | Japan | 428/195 |
| 49-980 | 1/1974 | Japan | 428/195 |
| 49-27421 | 3/1974 | Japan | 428/195 |
| 50-35993 | 4/1975 | Japan | 428/195 |
| 50-35992 | 4/1975 | Japan | 428/195 |
| 51-26235 | 3/1976 | Japan | 428/195 |
| 54-43180 | 4/1979 | Japan | 428/195 |
| 54-70402 | 6/1979 | Japan | 428/195 |
| 57-60160 | 4/1982 | Japan | 428/195 |
| 58-180689 | 10/1983 | Japan | 428/195 |
| 59-115900 | 7/1984 | Japan | 428/195 |
| 4-001032 | 6/1990 | Japan | 428/195 |
| 2-145320 | 6/1990 | Japan | 428/195 |
| 2224237 | 5/1990 | United Kingdom | 428/195 |

*Primary Examiner*—B. Hamilton Hess
*Attorney, Agent, or Firm*—Oliff & Berridge

[57] ABSTRACT

There is provided a thermal transfer type emblem made of thermoplastic synthetic resin comprising three-dimensional design elements made of a flexible thermoplastic synthetic resin sheet as well as a method of manufacturing the same. Design elements formed with a design printed in color on the surface are bonded to the underside of a carrier film and a hot-melt type film is bonded to the lower surface of each of said design elements. If necessary, a synthetic resin adhesive layer is provided therebetween and said hot-melt type film may be bonded to a sheet of releasing paper at the underside. By appropriately selecting materials for the hot-melt type film and the synthetic resin adhesive layer, the flexible and three-dimensional emblem can be so made as to firmly adhere to an object by simply pressing the emblem with an iron regardless of the material of the object.

5 Claims, 2 Drawing Sheets

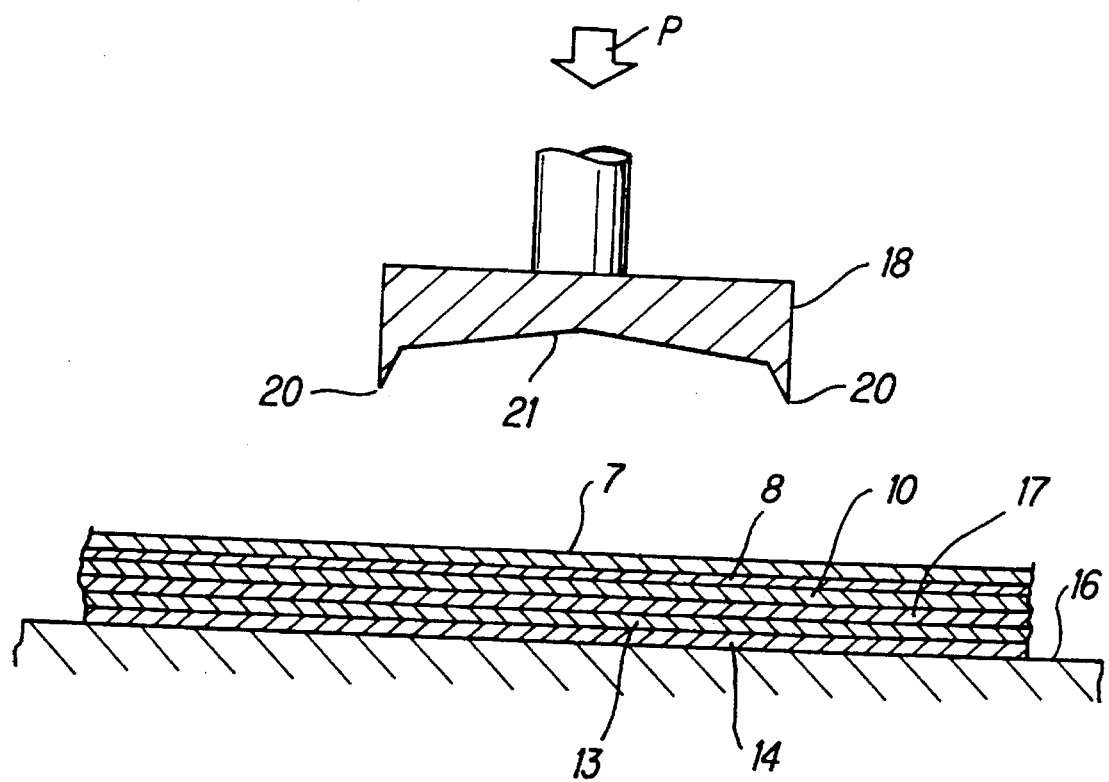

5,599,416

THERMALLY TRANSFERABLE TYPE EMBLEM MADE OF THERMOPLASTIC SYNTHETIC RESIN AND METHOD OF MANUFACTURING THE SAME

This a Division of application Ser. No. 08/151,110 filed Nov. 12, 1993, now U.S. Pat. No. 5,520,988.

BACKGROUND OF THE INVENTION

This invention relates to a thermally transferable type emblem or ornamental decoration piece made of a thermoplastic synthetic resin to be suitably used to apply a design by heating and pressing it on the surface of an object such as clothing, bags, sports or office equipment, stationery made of fiber, textile, synthetic resin, leather, metal, etc.

It is known in JP-A-2 145320 to prepare an ornamental design product, or piece such as an emblem, a sticker or the like by high-frequency-induction heating flexible thermoplastic synthetic resin.

As disclosed by JP-B-57 60160, it is also known to produce a flexible thermoplastic synthetic resin emblem in the form of a relief design on a fabric by means of high frequency induction heating and the produced design is then transferred onto an object also by means of high-frequency-induction-heating.

However, an ornamental design product according to the above JP-A-2 145320 requires its base portion to be sawed or bonded with adhesive onto the surface of an object such as a piece of clothing, and thus can not give an aesthetically unsatisfactory appearance to those who see it while it is not particularly convenient to be put on the object depending on the location thereof if the object has a complicated profile.

The method disclosed in said JP-B-57 60160 requires a step of transferring the object from a processing plant where the object is produced, to another plant where the design transferring operation is carried out by the high-frequency-induction-heating, and then returning the object to the processing plant, so as to require enormous cost, labor and time for transportation and keeping the object under controlled conditions.

Such inconvenience is remarkable particularly when a component off a piece of clothing is independently sent to a facility where an ornamental design product is fitted thereto and the fitted product is found defective, because all the remaining components of that piece of clothing become useless.

Additionally, there may be cases where objects onto which a design of an emblem is to be transferred are not compatible with high-frequency-induction-heating.

Embroidered ornamental design products and metal ornamental design products carrying hot melt adhesive on the back side are also known. However, there has not been proposed any thermal transfer type thermoplastic synthetic resin emblem that does not includes a base of a fabric or a synthetic resin sheet and that carries only hot melt adhesive attached to the back side off each of the elements of the design of the emblem that are three-dimensionally formed from a flexible thermoplastic synthetic resin sheet.

SUMMARY OF THE INVENTION

Therefore an object of the present invention is to provide a thermally transferable type thermoplastic synthetic resin emblem carrying a design which is three-dimensional formed from a flexible thermoplastic synthetic resin sheet and can be transferred on an object by simple heating and pressing means regardless of the material of the object as well as a method of manufacturing such emblems.

According to the first aspect of the invention, the above object is achieved by providing a thermally transferable type emblem made of thermoplastic synthetic resin comprising: a three-dimensional design element (10) made of a thermoplastic synthetic resin sheet and cut along respective contours (11), said design element (10) being formed with a three-dimensional design; a hot-melt type film (13) bonded to said design elements (10) and having a contour corresponding to the contours (11) of the design elements (10); and a transparent carrier film (7) stickily adhered to the upper surface of the design element (10), said carrier film (7) being more resistive to heat than said design element (10) and the hot-melt type film (13).

Preferably, the emblem further comprises a sheet of releasing paper (14) bonded to the lower surface of said hot-melt type film (13). Also, preferably, the carrier film (7) is stickily adhered to the upper surface of the design element (10) by means of tacky adhesive (8). If the design element (10) is not directly bonded to the hot-melt type film (13), the emblem further comprising a synthetic resin adhesive layer (12) disposed under said design elements (10) and also cut along the contours (11) of the design elements, said a hot-melt type film (13) being bonded to said design elements (10) with said synthetic resin adhesive layer (12), and said carrier film (7) being more resistive to said heat than synthetic resin adhesive layer (12).

According to the second aspect of the invention, the above object is achieved by providing a method of manufacturing a thermally transferable type emblem made off the thermoplastic synthetic resin, comprising the steps of: (a) placing a hot-melt type film (13) on a pole plate (16) of an electrode die for high-frequency-induction, (b) laying a thermoplastic synthetic resin sheet (10) formed with design thereon on said the hot-melt type film (13), (c) stickily bonding a transparent carrier film (7) on the upper surface of said thermoplastic synthetic resin sheet (10) to produce a multilayer structure, said transparent carrier film (7) being more resistive to heat than said hot-melt type film (13) and said thermoplastic synthetic: resin sheet (10); (d) melting and cutting said hot-melt type film (13) and said thermoplastic synthetic resin sheet (10) of said multilayer structure along design contours (11) by pressing an engraving die (18) thereon and applying a high frequency wave thereto to produce three-dimensional design elements; (e) cooling said multilayer structure, (f) removing unnecessary portions of said multilayer structure other than said design elements (10).

Preferably, said hot-melt type film (13) is stickily adhered with a releasing paper (14) on the backside thereof: after the step (e), the releasing paper (14) is removed; and after the step (f), the releasing paper (14) is again bonded to the exposed backside of said hot-melt type film (13). If the emblem includes a synthetic resin adhesive layer (12) disposed under said design elements (10), the method further comprising; after the step (a), laying a synthetic resin adhesive sheet (17) on the surface of said hot-melt type film (13), said synthetic resin adhesive sheet (17) being capable of adhering to both said film (13) and said thermoplastic synthetic resin sheet (10): and in the step (b), laying said thermoplastic synthetic resin sheet (10) on said synthetic resin adhesive sheet (17).

An emblem according to the first aspect of the invention can be firmly bonded onto an object simply by placing it appropriately on the object and heating and pressing it from the toll or the underside of the object with an iron, a heat press machine and the like.

Therefore, according to the emblem of the present invention, it is not necessary to transfer an object such as clothing, sports equipment from a plant of manufacturing the object to the other plant (having an electrode die for high-frequency-induction) of applying an emblem of the prior art in order to apply or bond the emblem to the object, and to return the object with the emblem to the plant of manufacturing the object. Thus, according to the present invention, it is merely necessary to transfer the object from the plant of manufacturing the emblem to the plant of manufacturing the object.

The emblem according to the present invention can be applied or thermally transferred to an object such as a clothing, a bag, a sports equipment, an office equipment, a stationery etc. The hot-melt type film to be used for the emblem according to the present invention may be made of a material suitable for the material of the object. If the design layer and the hot-melt type film are not bonded very well, the synthetic resin adhesive layer capable of strongly adhering to both the design layer and the hot-melt type film may be additionally arranged therebetween. With such synthetic resin adhesive layer, the emblem can be easily applied or thermally transferred to the object by simply heating and pressing the emblem.

Since the tupper surface of the design layer having a lot of design elements is stickily adhered to the carrier film by means of tacky or stick adhesive, the design elements may be transferred and accurately positioned onto the surface of an object in a single operation, even if the design elements are isolated from each other.

Since the carrier film of an emblem according to the invention is transparent, the design of the emblem is always visible and can be correctly placed in position for thermal transfer operation.

Additionally, since the design of an emblem according to the invention is not formed on a thick base as in the case of a conventional embroidered ornamental design product or a conventional emblem made of synthetic resin, the design components made of flexible thermoplastic synthetic resin of the present invention can be directly bonded onto the object so as not to damage the appearance (aesthetic satisfaction) of the object with the emblem, and so as to freely select the position of the emblem in the object.

According to the second aspect of the invention, the hot-melt type film depending on the material of the object, the flexible thermoplastic synthetic resin sheet for forming the design and a carrier film having a melting point higher than those of the above materials are selected. If necessary, a synthetic resin adhesive sheet capable of firmly bonding the hot-melt type film and the flexible thermoplastic synthetic resin sheet is selected. Then, the hot-melt type film (with a releasing paper, if necessary) is placed on a pole plate of an electrode die for high-frequency-induction. Then, the synthetic resin adhesive sheet is placed onto the hot-melt type film, if necessary. The flexible thermoplastic synthetic resin sheet printed with a design is placed onto the synthetic resin adhesive sheet or hot-melt type film. Then, the carrier film is placed onto the flexible thermoplastic synthetic resin.

Then, in the second step, the multilayer structure thus obtained is pressed by an engraving die while a high frequency wave is applied thereto to cut the film and sheets and to form the three-dimensional design elements on the flexible thermoplastic synthetic resin.

Because of the heat resistivity of the carrier film, the carrier film is not molten nor cut by the engraving die in the second step.

After removing the processed multilayer structure from the pole plate and cooling it, in the third step, the sheet of releasing paper is peeled off from the backside of the hot-melt type film, if necessary. Then, the unnecessary portions (in other words, the portion except the design) of the multilayer structure are removed by means of, for example, tweezers. If necessary, the sheet of releasing paper is bonded again to the back side of the hot-melt type film to complete the operation of producing an emblem according to the invention.

BRIEF DESCRIPTION OF THE DRAWINGS

FIG. 3 is an enlarged schematic sectional view, showing the process of manufacturing an emblem according to the invention.

DESCRIPTION OF THE PREFERRED EMBODIMENT

Figure 1:
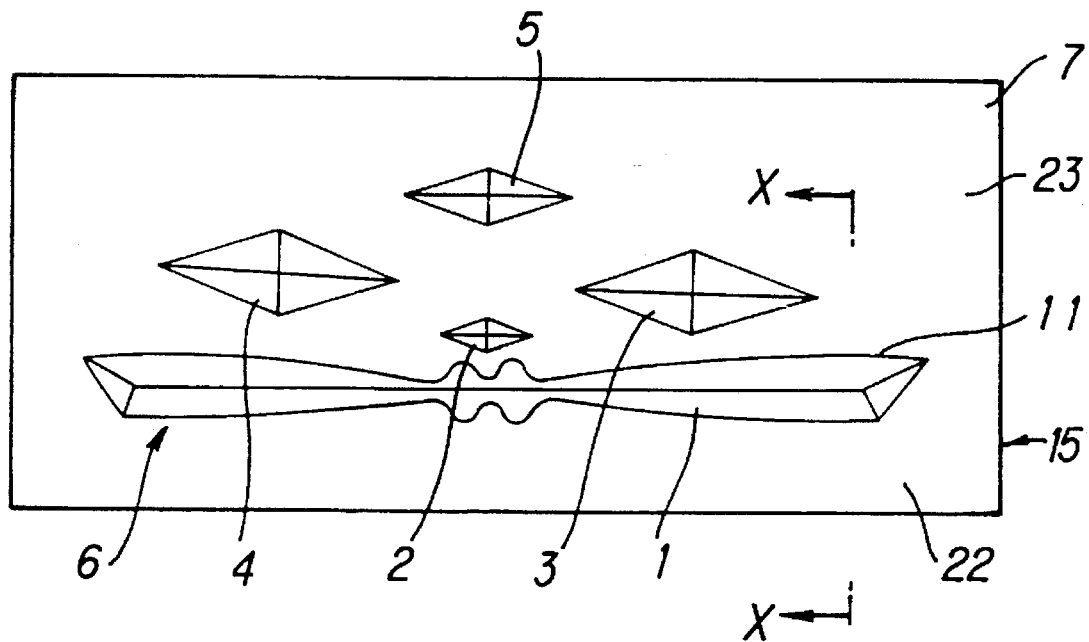
FIG. 1 is a schematic plan view of a preferred embodiment of the invention.
Figure 2:
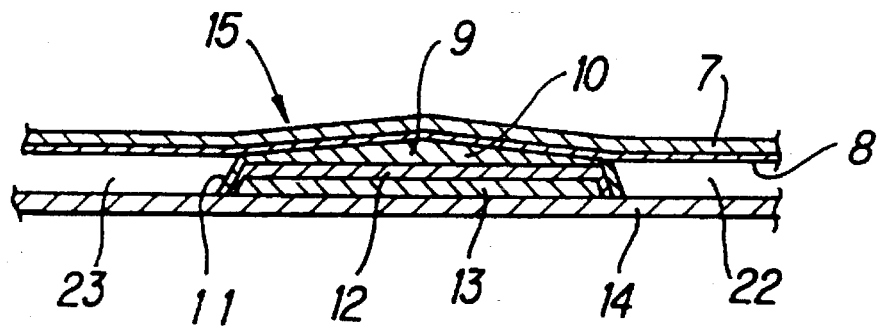
FIG. 2 is an enlarged schematic sectional view cut along X—X line of FIG. 1.

FIGS. 1 and 2 schematically illustrate a preferred embodiment of the first aspect of the present invention. In the illustrated embodiment, the emblem carries a design 6 composed of a number of design elements 1, 2, 3, 4 and 5.

The design elements 1, 2, 3, 4 and 5 are bonded to a carrier film 7 of a polypropylene sheet with tacky adhesive 8.

Although the design elements 1 through 5 are differently shaped, they have the same three-dimensional structure (the same sectional structure) and therefore only the element 1 will be described hereinafter.

As shown in FIG. 2 with enlarged dimensions, the design element 1 includes a design layer 10 of a flexible thermoplastic synthetic resin which has a given three-dimensional form (design) 9. In the preferred embodiment, the design layer 10 is made of polyurethane sheets and an aluminum foil (not shown) sanded therebetween. The layer 10 is cut along a contour 11 of the design element 1 by heat-melting. In the illustrated embodiment, a given pattern is printed in color on the surface of the polyurethane sheet 10.

Said design element 1 is then bonded onto a hot-melt type film layer 13, which is made of polyamides in this embodiment, by means of a synthetic resin adhesive layer 12 arranged therebetween. The layer 12 is made of a thermosetting resin in this embodiment. Said synthetic resin adhesive layer 12 and said hot-melt type film layer 13 having a contour same as that off the design element 1.

Then, the lower surface of the hot-melt type layer 13 is bonded with a sheet of releasing paper 14 to produce a complete emblem or decoration piece 15 in this embodiment.

The layer 12 may be omitted, if unnecessary. On the other hand, another layer may be added, for example, two hot-melt type film layers may be provided and a layer for avoiding an invasion of a die may be provided between the hot-melt type film layers. The invention is not limited to the illustrated embodiment.

The emblem 15 illustrated in FIGS. 1 and 2 is prepared by means of an apparatus schematically illustrated in FIG. 3, by the method comprising the steps as described below.

In the first step, the hot-melt type film layer 13 and the sheet of releasing paper 14 bonded onto the lower surface of the layer 13 are placed on a pole plate 16 of an electrode die for high-frequency-induction, which is not shown in FIG. 3.

The hot-melt type film layer 13 is preferably made of polyamides having a melting point of 120° C., if the emblem is used for a fabric product and subjected to dry cleaning and/or ironing operations, in other words, the emblem requires high temperature resistance. If the emblem is used to bond it onto a synthetic leather such as urethanes, vinyl chlorides, the hot-melt type film layer 13 is preferably made of polyurethanes having a melting point of approximately 100° C. If the emblem is used to bond it onto a plastic material such as polyester, polyvinyl chloride, polycarbonate, or a metal such as iron, copper or aluminum, the hot-melt type film layer 13 is preferably made of polyesters having a melting point of around 120° C. If the emblem is designed as a general type that may be used of a wide variety of materials including wood, metal and fiber, the hot-melt type film layer 13 is preferably made of an EVA having a melting point of 83° C. If the emblem is used for an object made of hard vinyl chloride, the hot-melt type film layer 13 is preferably made of an EVA having a melting point of 100° C.

Then, a synthetic resin adhesive sheet 17 is superposed on the surface of said hot-melt type film layer 18. The synthetic resin adhesive sheet 17 forms the synthetic resin adhesive layer 12 and firmly bonds the design layer 10 and the hot-melt type film layer 18. The adhesive sheet 17 may be made of polyurethane, heat setting synthetic resin or a moisture-setting synthetic resin.

Thereafter, the flexible thermoplastic synthetic resin layer 10 of the design element 1 is superposed on the surface of said synthetic resin adhesive sheet 17. The thermoplastic synthetic resin layer 10 is formed with a design such as a printed pattern, letter, symbol, color and the like. The thermoplastic synthetic resin layer 10 is made of a flexible thermoplastic synthetic resin such as polyurethane, vinyl chloride.

In this stage of operation, a thin and foamed sheet of thermoplastic synthetic resin may be interposed between the design layer 10 and the synthetic resin adhesive sheet 17. Other materials and sheets may be interposed between the design layer 10 and the synthetic resin adhesive sheet 17, if necessary.

Then, a transparent carrier film 7 is laid and bonded on the upper surface of the design layer 10 with a sticky adhesive layer The carrier film 7 is made of a material, such as polypropylene, having a melting point higher than those of the hot-melt type film layer 13, the synthetic resin adhesive sheet 17 and the design layer 10, and hence resistive to heat.

The sticky adhesive layer 8 should be made of a material that may not permeate into the design layer 10.

After laying a number of layers on the pole plate 16 in the above described first step, an engraving die or cutter-mold presses against the multilayer structure along she direction as indicated by arrow P and, at this time, a high frequency wave is applied to it from a high frequency induction heater (not shown).

The engraving die 18 has a processing surface which is provided with a fusion cutter 20 having a plan view corresponding to the contour 11 of the design element 10 to be formed and a design area 21 where a design is engraved. Thus, since the engraving die 18 presses the multilayer structure and a high frequency wave is applied thereto, the design layer 10, the synthetic resin adhesive sheet 17 and the hot-melt type film layer 13 are molten and cut along the contour 11 of the design element 1 to produce a three-dimensional form (design) 9 in the contour 11.

In this operation, since the carrier film 7 and the releasing paper 14 are more resistive to heat than the other layers, they are neither molten nor cut.

The design element thus formed with the three-dimensional design is removed from the polar plate 16 and cooled. Then, in the third step, the releasing paper 14 is peeled off and an unnecessary portions 22, 2:3 of the materials as indicated in FIGS. 1 and 2 are removed by, for example, using tweezers. Then, the releasing paper 14 is bonded again to the lower surface of the hot-melt type film layer 13 of the design elements 1 to complete the preparation of the emblem 15.

When using, in other words, the emblem or decoration piece thus obtained is thermally transferred to the surface of an object such as a piece of clothing, sports or office equipment or stationery, the releasing paper 14 is peeled off from the emblem 15, which is then placed in position on the object and pressed against the object at a temperature between 100° and 160° C. under a pressure between about 0.1 kg/cm² and 3 kg/cm² for a period between 0.5 and 5 seconds by means of a heat press or an iron depending on the thermal characteristics of the hot-melt type film layer 13 involved, to thermally transfer the design onto the object. After the emblem element 15 is cooled, the carrier film 7 is removed to complete the operation of thermally transferring the design of the emblem 15.

When transferring the design of the emblem 15 to the object, it is preferable to heat and press the object that receives the design from the other side thereof, but the emblem 15 may be heated and pressed directly against the object depending on the type of the design and that of the object.

With an emblem according to the invention, the operation of transferring the emblem can be carried out simply by heating and pressing it onto the object because the emblem can be placed easily and correctly in position as it is seen through the transparent carrier film.

The present invention is advantageous in that only a simple electrode die for high-frequency-induction is required as equipment for manufacturing emblems and the manufactured emblems can be used without massive equipment in a plant that manufactures products for receiving the design of the emblems. So, the present invention can enormously save labor and cost in a plant that uses emblems to print designs on the products it manufactures as no electrode die for high-frequency-induction is required there nor the products do not need to be moved to and from a facility where such an apparatus is installed.

Since the hot-melt type layer can be made of a material that is suited to the object onto which the design of the emblem is transferred, allowing an emblem according to the invention to have a wide variety of applications.

Since a number of design elements are bonded to a single carrier film in an emblem according to the invention, the design elements do not lose the proper arrangement even if they are isolated from each other.

Since the design elements are not carried by a thick fabric or a thick synthetic resin sheet and the design of the emblem is directly and three-dimensionally put on the surface of the object, an emblem according to the invention provides an enhanced degree of freedom of design for the designer.

Since the hot-melt type layer may be made of a material suited to the object onto which the design of the emblem is transferred, and since the material for the synthetic resin adhesive sheet may be so selected as to be suited to bond the hot-melt type layer and the design elements made of a flexible thermoplastic synthetic resin, an emblem according to the invention may be allowed to have a wide variety of applications from the view point of the material of the object.

Since an emblem according to the invention is prepared by arranging a number of film layers on a hard pole plate and using an engraving die and high frequency induction heating, fine and exquisite three-dimensional patterns may be reliably formed as compared with conventional emblems that are normally formed on a thick fabric or a thick synthetic resin sheet.

What is claimed is:

1. A method of manufacturing a thermally transferable emblem made of thermoplastic synthetic resin, comprising the steps of:

(a) placing a hot-melt film on a pole plate of an electrode die for high-frequency-induction;

(b) laying a flexible thermoplastic synthetic resin sheet formed with a design thereon on said hot-melt film;

(c) removably bonding a transparent carrier film on the upper surface of said flexible thermoplastic synthetic resin sheet to produce a multilayer structure, said transparent carrier film being more resistive to heat than said hot-melt film and said flexible thermoplastic synthetic resin sheet;

(d) melting and cutting said hot-melt film and said flexible thermoplastic synthetic resin sheet of said multilayer structure along design contours by pressing an engraving die thereon and applying a high frequency wave thereto to produce three-dimensional design elements;

(e) cooling said multilayer structure;

(f) removing unnecessary portions of said multilayer structure other than said design elements.

2. A method of manufacturing a thermally transferable emblem according to the claim 1, wherein said hot-melt type film is stickily adhered with a releasing paper on the backside thereof, after the step (e), the releasing paper is removed, and after the step (f), the releasing paper is again bonded to the exposed backside of said hot-melt film.

3. A method of manufacturing a thermally transferable emblem according to the claim 1, further comprising after the step (a), laying a synthetic resin adhesive sheet on the surface of said hot-melt film, said synthetic resin adhesive sheet being capable of adhering to both said hot-melt film and said flexible thermoplastic synthetic resin sheet; and in the step (b), laying said flexible thermoplastic synthetic resin sheet on said synthetic resin adhesive sheet.

4. A method of manufacturing a thermally transferable emblem according to claim 1, further comprising:

after the step (a), laying a synthetic resin adhesive sheet on the surface of said hot-melt film, said synthetic resin adhesive sheet being capable of adhering to said hot-melt film;

laying a foamed sheet of thermoplastic synthetic resin on said synthetic resin adhesive layer; and in the step (b), laying said flexible thermoplastic synthetic resin sheet on said foamed sheet of thermoplastic synthetic resin.

5. A method of manufacturing a thermally transferable emblem according to claim 1, said step (c) comprising:

applying a layer of tacky adhesive on the upper surface of said flexible thermoplastic synthetic resin sheet; and laying said transparent carrier film on said layer of tacky adhesive.

* * * * *